United States Patent [19]

Gonzales

[11] Patent Number: 4,935,152
[45] Date of Patent: Jun. 19, 1990

[54] COLLECTOR APPARATUS AND METHOD FOR RECOVERY OF OIL SPILLS, AND THE LIKE

[76] Inventor: Jose M. F. Gonzales, 233 N. Parkview Ave., Los Angeles, Calif. 90026

[21] Appl. No.: 361,938

[22] Filed: Jun. 6, 1989

[51] Int. Cl.$^5$ ............................................. C02F 1/40
[52] U.S. Cl. ..................................... 210/747; 210/776; 210/923; 405/64; 405/68
[58] Field of Search ............ 210/747, 776, 170, 242.1, 210/242.3, 923; 405/63, 64, 66, 68

[56] References Cited

U.S. PATENT DOCUMENTS

| | | | |
|---|---|---|---|
| 3,556,301 | 1/1971 | Smith | 210/776 |
| 3,650,406 | 3/1972 | Brown et al. | 210/923 |
| 3,722,688 | 3/1973 | Wirsching | 210/776 |
| 3,722,690 | 3/1973 | Stenström | 210/776 |
| 3,724,662 | 4/1973 | Ortiz | 210/923 |
| 3,788,079 | 1/1974 | Kirk et al. | 210/923 |
| 3,876,540 | 4/1975 | Falxa | 210/923 |
| 4,116,007 | 9/1978 | Stagemeyer et al. | 210/242.3 |
| 4,184,527 | 1/1980 | Kawamura | 210/242.3 |
| 4,231,873 | 11/1980 | Swigger | 210/170 |
| 4,378,291 | 3/1983 | Ward et al. | 210/242.3 |
| 4,610,794 | 9/1986 | Tsahalis | 210/923 |

FOREIGN PATENT DOCUMENTS

| | | |
|---|---|---|
| 2921667 | 12/1980 | Fed. Rep. of Germany . |
| 52-13164 | 2/1977 | Japan . |
| 1371993 | 10/1974 | United Kingdom . |

Primary Examiner—W. Gary Jones
Assistant Examiner—Christopher Upton
Attorney, Agent, or Firm—Willie Krawitz

[57] ABSTRACT

Spills such as from oil, chemicals, and the like on a body of water are recovered by overlaying the spill, or a portion thereof, with an inflatable, weighted collector. The collector may be airlifted or carried by boat to the spill site, followed by overlaying on the spill surface. Following inflation, the weights will cause the central portion of the collector to sink below the level of the spill of the contaminated area, and the contaminants will overflow, and/or be pumped into the collector. If required or necessary, water entering the collector may be removed by pumping. When the collector is filled, it can be towed away to a recovery unit by a barge or simultaneously pumped into a tanker or other on-shore facility.

7 Claims, 2 Drawing Sheets

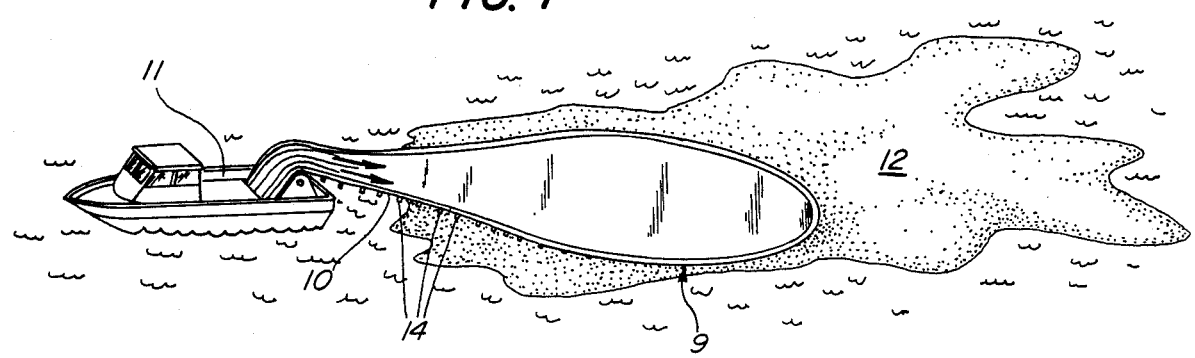
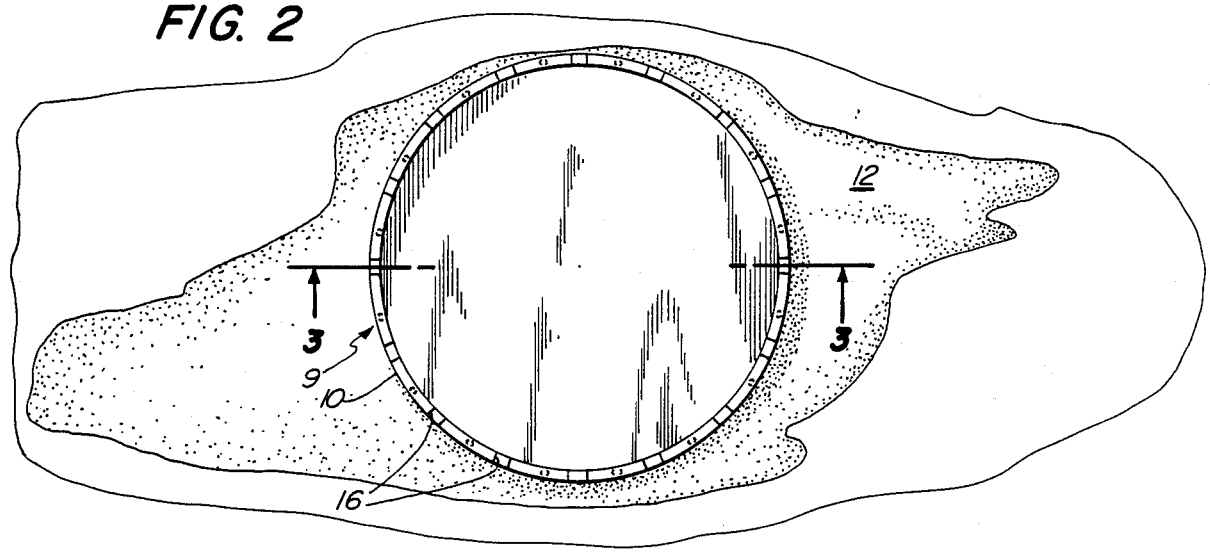
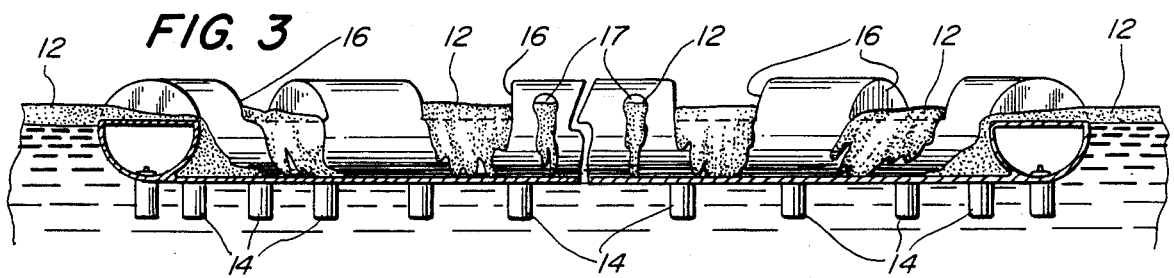
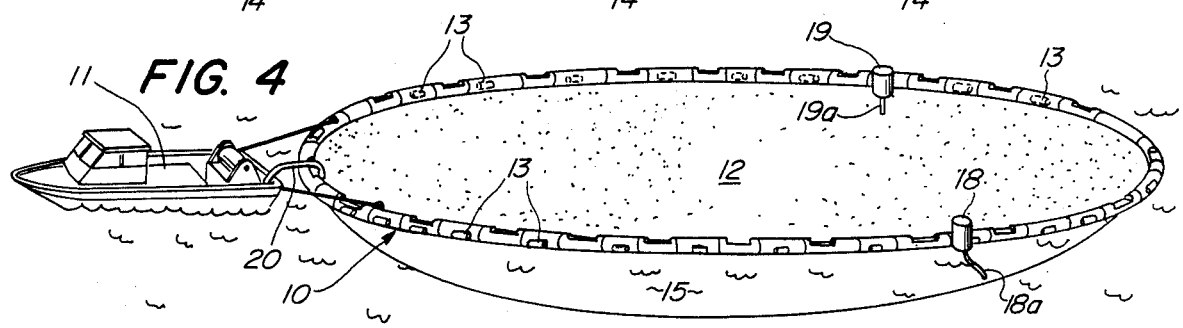

COLLECTOR APPARATUS AND METHOD FOR RECOVERY OF OIL SPILLS, AND THE LIKE

BACKGROUND OF THE INVENTION

This invention relates to a new and improved collector and method for recovering spills on water such as oil, chemicals, and the like. These types of spills are occuring with greater and alarming frequency due to tanker and barge traffic on oceanic, lake and river areas. In most cases, the spills are accidental in nature due to collision, running aground, ship breakup caused by heavy seas, and inadvertant release of noxious substances, whether on a boat or from a facility on land. In other cases, the release of these substances is intentional, and designed to purge or release contaminants from a system in the least expensive manner.

In the case of oil spills, it becomes very difficult to contain and remove or recover the oil which can move quickly as a very thick slick. So far, attempts to control or divert these slicks have not been considered very successful.

THE INVENTION

According to the invention, a collector for oil and chemical spills, and the like and method, is provided for the recovery of these spills.

The collector comprises an inflatable device which is transported by air or boat to the spill site and then unloaded and spread out to overlay the spill, or portion thereof. The collector is then manually or automatically inflated, using commercially available devices, to its final operating shape. The collector will be weighed down due to attached weights and sinks into or below the bottom level of the spill. The oil spill material is then pumped into or fills into the collector. When the collector becomes sufficiently full, it is towed away for possible off-loading at a terminal, pumping into a tanker, pipe line, etc., for treating, reclaiming, use as fuel, etc.

This technique enables an oil slick to be physically removed or reduced in size, rather than having to wait for the slick to arrive on shore and present a serious problem of neutralization and removal. Basically, the collector can be used on oil and chemical spills and slicks that are lighter than water and which are present as a separate phase, or which may form a separate phase that lies below the water surface.

BRIEF DESCRIPTION OF THE DRAWINGS

FIG. 1 is a schematic representation of the collector device of this invention as it is applied from a vessel to overlay a portion of an oil slick;

FIG. 2 is a schematic, plan view of the collector overlaying a portion of the oil slick;

FIG. 3 is a schematic view of the collector in sectional side elevation, taken along lines 3—3 of FIG. 2, the oil from the slick being shown overflowing and/or being pumped into the collector;

FIG. 4 is a schematic representation of the collector filled with reclaimed oil from the oil slick, and being towed away by a vessel while being simultaneously emptied; and, FIG. 5 is an external perspective view of another embodiment of the invention.

DESCRIPTION OF THE PREFERRED EMBODIMENTS

Figure 5:
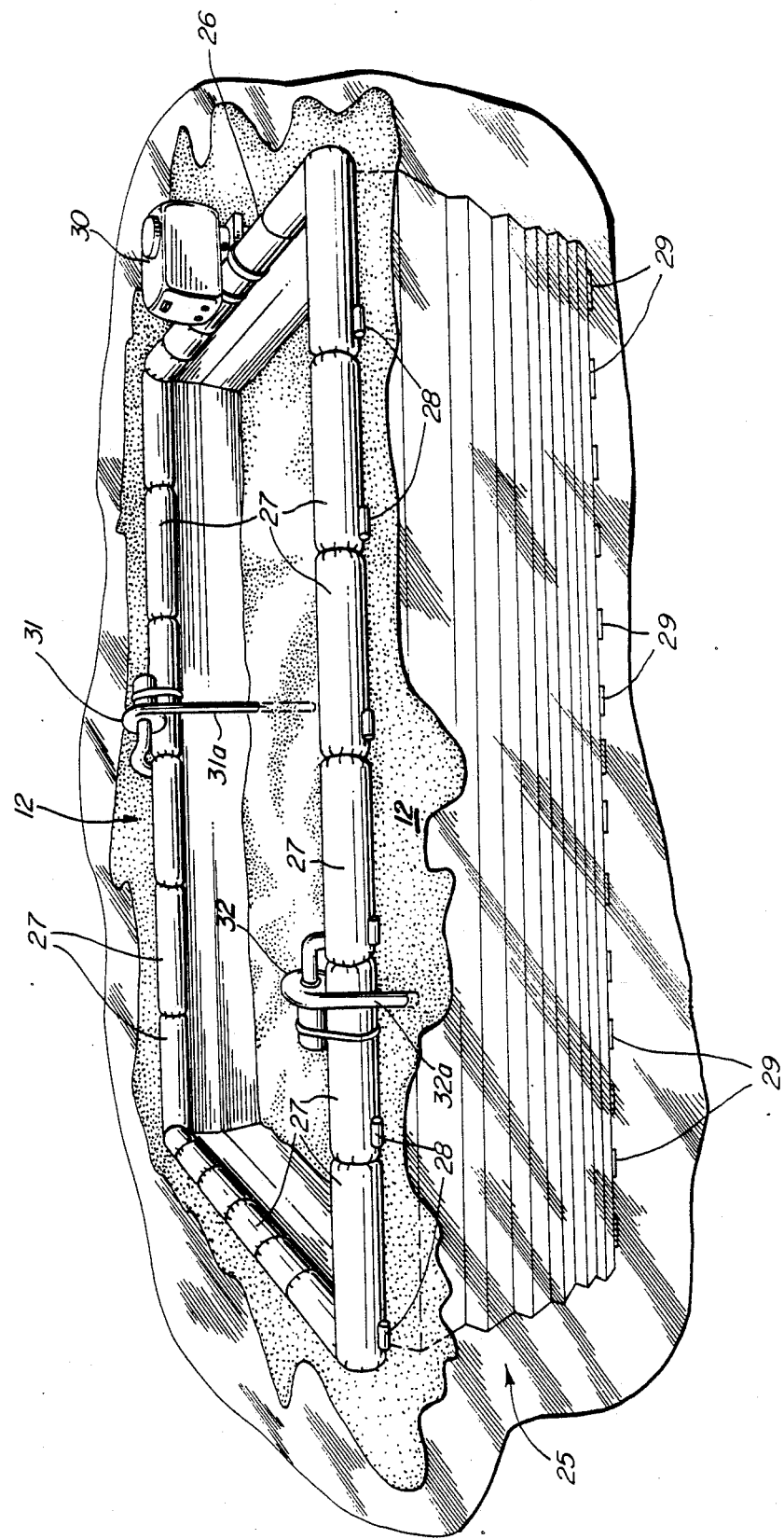

The inflatable collector 9 of this invention, having an inflatable periphery 10, is shown in a collapsed state in FIG. 1 being dropped or cast off from a vessel 11, such as in a rolled form, in the direction shown by the arrows onto or in the vicinity of an oil slick 12. Alternatively, the collector 9 can be dropped from an airplane, helicopter, hovercraft, etc., operating from a vessel or from a shore base. Typical sizes of the collector may vary from about 50–150 feet in diameter and about 10–25 feet deep. The collectors may be constructed of plastic film such as polyester, nylon, polyethylene, polypropylene, PVC, polyvinylidene fluoride, and various rubber types. Also, the collectors may be reinforced by external rope webbing.

A plurality of cannisters 13, only a portion of these cannisters being shown, containing compressed air or $CO_2$, are mounted with connected pull-out triggering devices (not shown) peripherally of the collector. When the collector impacts the water the cannisters are either manually or automatically inflated, thereby inflating the periphery and floating the collector.

Weights 14 are attached to the bottom of the collector to weigh down the collector in the oil slick, thereby forming a cavity 15 in the collector as a repository for the oil.

A plurality of slots 16 and entry ports 17 may be defined by the collector through which the oil slick 12 passes as it enters the collector. One or more pumps 18 are employed to pump oil from the slick into the collector via a line 18a. A pump 19 may be used to remove water present in the bottom of the collector via line 19a. While the pumps are usually mounted on the collector, as shown, they also may be located remote from the collector for example on the vessel 11.

In some instances, where feasible, waves or ocean swells may be the only force required to drive the slick into the collector, with or without additional pumping force being necessary.

When the collector becomes sufficiently full, it is towed away by the vessel 11, which can also be used to pump out the oil via a line 20 to a supply ship, not shown. Alternatively, detachable marine motors may be used to move the collector independantly, or in conjunction with towing by the vessel 11. The oil can then be treated and reclaimed, where possible, or otherwise disposed of, such as by burning for fuel. Obviously, depending on the extent of the oil spill, as many collectors may be used as necessary. Moreover, the collector and method of this invention may be employed in conjunction with existing techniques for handling oil spills, such as containment systems, using floats, log booms, etc.

FIG. 5 illustrates another embodiment of the invention using an oblong or square shaped collector 25, but which omits the slots and entry ports shown in FIG. 3. The collector provides an upper periphery 26, forming inflated segments 27 by means of cannisters 28 of compressed air or $CO_2$ that are actuated manually or automatically. A plurality of weights 29 are attached to the collector prior to being released or cast off from a vessel, helicopter, etc., or the weights 29 may be attached after the collector has been inflated. The collector is then towed onto or adjacent the oil slick 12. A pump 31 is mounted on the collector for removing excess water via a line 31a which has an intake located near the bottom of the collector. Oil or chemicals from the slick 12 are pumped into the collector using an oil removal pump 32 through a suction line 32a. During the recovery process, when no further water is observed being pumped from the system, this indicates that the collector is full mainly of oil from the slick.

It will be appreciated that other equivalent modes of effecting the method of this invention may be employed, without departing from the scope, thereof. For example, the collector can be inflated, towed to the vicinity of the oil slick 12, and then weights 14 are attached by, say, underwater divers. The weighed down collector is then towed over the oil slick 25, or adjacent thereto, prior to pumping the oil slick into the collector.

I claim:

1. A method for collecting a contaminant floating on water or forming a separate phase therewith, comprising the steps of:
   a. overlaying the contaminant or portion thereof with a collector device including an upper, inflatable, peripheral portion, and an inner, central portion attached thereto;
   b. inflating the peripheral portion, thereby causing the collector to float on the contaminant, and weighing down the central portion of the collector to form a cavity into or below the contaminant;
   c. filling the cavity with contaminant; and,
   d. removing the contaminant from the collector.

2. The method of claim 1, in which the collector is filled with contaminant by pumping.

3. The method of claim 1, in which water that is present with the contaminant in the collector is removed by pumping.

4. The method of claim 1, in which pumps for filling the contaminant into the collector and pumps for removing water from the collector are mounted on the collector.

5. The method of claim 1, in which pumps for filling the contaminant into the collector are positioned on a vessel adjacent the collector.

6. The method of claim 1, in which the contaminant is oil.

7. The method of claim 1, in which the collector is dropped or cast off from a transportation means including a vessel, airplane, helicopter and hovercraft.

* * * * *